(12) United States Patent
Van De Walle De Ghelcke et al.

(10) Patent No.: US 10,685,520 B2
(45) Date of Patent: Jun. 16, 2020

(54) BORDER CONTROL SYSTEM AND METHOD

(71) Applicant: MASTERCARD INTERNATIONAL INCORPORATED, Purchase, NY (US)

(72) Inventors: Brice Van De Walle De Ghelcke, Waterloo (BE); Joseph Mitchell, Dublin (IE); Chris O'Mahony, Wicklow (IE); Karl Monaghan, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/988,896

(22) Filed: May 24, 2018

(65) Prior Publication Data

US 2018/0342120 A1    Nov. 29, 2018

(30) Foreign Application Priority Data

May 24, 2017 (EP) .................................. 17172894

(51) Int. Cl.
*G06K 5/00* (2006.01)
*G07C 9/25* (2020.01)
(Continued)

(52) U.S. Cl.
CPC ............. *G07C 9/257* (2020.01); *B42D 25/24* (2014.10); *G06F 21/32* (2013.01); *G06F 21/34* (2013.01);
(Continued)

(58) Field of Classification Search
CPC ... G07C 9/00087; B42D 25/24; G06F 521/32; G06F 21/34; G06K 9/00288; G06K 9/00926; H04L 9/3228
See application file for complete search history.

(56) References Cited

U.S. PATENT DOCUMENTS

2004/0066273 A1* 4/2004 Cortina ............ G06K 19/07764
340/5.1
2006/0219776 A1* 10/2006 Finn ........................ B60R 25/25
235/380
(Continued)

FOREIGN PATENT DOCUMENTS

GB    2418511 A    3/2006
GB    2515142 A    12/2014
(Continued)

OTHER PUBLICATIONS

"International Search Report and Written Opinion Issued in PCT Application No. PCT/US2018/029548", dated Jul. 12, 2018, 12 Pages.

*Primary Examiner* — Thien M Le
(74) *Attorney, Agent, or Firm* — Talem IP Law, LLP

(57) ABSTRACT

A computer-implemented method for border control is described. The method involves interaction between a user computing device and a management server. The following actions are performed at the user computing device. A registration process is performed that involving captures user information and a stored biometric of the user from a user travel document. A first fresh user biometric is also captured at the user computing device for verification to register the user at the management server. At least one check step is then performed during passage through a border control area, this check step comprising capturing a second fresh user biometric for verification and generation of a time limited code for completing the check step. Suitable apparatus to implement this method is also described.

20 Claims, 16 Drawing Sheets

(51) Int. Cl.
*G06Q 50/26* (2012.01)
*B42D 25/24* (2014.01)
*G06F 21/32* (2013.01)
*G06F 21/34* (2013.01)
*G06K 9/00* (2006.01)
*H04L 9/32* (2006.01)
*G07C 9/26* (2020.01)

(52) U.S. Cl.
CPC ..... *G06K 9/00288* (2013.01); *G06K 9/00926* (2013.01); *G06Q 50/265* (2013.01); *G07C 9/253* (2020.01); *H04L 9/3228* (2013.01); *G07C 9/26* (2020.01)

(56) References Cited

U.S. PATENT DOCUMENTS

| | | | | |
|---|---|---|---|---|
| 2013/0238503 A1* | 9/2013 | Patel | ................... | G06Q 20/385 705/44 |
| 2013/0332826 A1* | 12/2013 | Karunamuni | ......... | G06Q 10/10 715/273 |
| 2015/0030216 A1* | 1/2015 | Abe | ................... | G06K 9/00067 382/124 |
| 2015/0033305 A1* | 1/2015 | Shear | ...................... | G06F 21/45 726/11 |
| 2015/0088776 A1* | 3/2015 | Parrish | ................... | G06Q 10/00 705/325 |
| 2015/0088778 A1* | 3/2015 | Tsao | ...................... | G06Q 50/265 705/325 |
| 2015/0281232 A1 | 10/2015 | Gormley et al. | | |
| 2016/0055695 A1* | 2/2016 | Saeedi | ............... | G07C 9/00087 340/5.52 |
| 2017/0310653 A1* | 10/2017 | Zhang | ................... | H04L 9/0637 |
| 2018/0268415 A1* | 9/2018 | Hwang | ................ | G06Q 20/325 |
| 2018/0338241 A1* | 11/2018 | Li | ........................... | H04L 67/12 |
| 2018/0343120 A1* | 11/2018 | Andrade | ............... | H04L 9/3231 |
| 2019/0035042 A1* | 1/2019 | Attar | .................... | G06Q 50/265 |

FOREIGN PATENT DOCUMENTS

| | | |
|---|---|---|
| KR | 2006 0099310 A | 9/2006 |
| RU | 2 617 335 C1 | 4/2017 |

* cited by examiner

BORDER CONTROL SYSTEM AND METHOD

FIELD OF DISCLOSURE

The present disclosure relates to a border control system and method. More particularly, the disclosure relates to a border control system and method allowing automation and digitisation of existing processes without loss of security.

BACKGROUND

Border control processes relating to the passage of individuals across national borders require high levels of accuracy and security. They are typically labour intensive, involving a manual check of credentials, and involve multiple computer systems. For air travel, there will typically be checks both by the airline at bag drop and at the gate, checks by national authorities between groundside and airside, with personal information being provided before boarding cards are issued to provide further traveller credentials.

These processes are currently automated to some degree. A traveller's boarding pass will typically comprise a 2-D barcode that provides user and travel details and which is scanned at bag drop, entry into security and at the gate. The boarding pass may be provided on a user's phone, rather than as a paper document. In addition to scanning of the barcode, manual checks are carried out for document irregularities and to confirm that there is a match between the traveller and his or her travel documents.

Despite this partial automation, travel checks are time consuming and reliant on manual checks to prevent errors and deliberate attempts to subvert the systems. This is particularly true of pre-flight processes such as bag drop and boarding gate entry, which require routine checks which can lead to significant queues and delays. It would be desirable to improve these processes for the benefit of the traveller, the airline and the border management service.

BRIEF SUMMARY

In a first aspect, the disclosure provides a computer-implemented method for border control involving interaction between a user computing device and a management server, the method comprising at the user computing device: performing a registration process involving capturing user information and a stored biometric of the user from a user travel document, while also capturing a first fresh user biometric at the user computing device for verification to register the user at the management server; and performing at least one check step during passage through a border control area, the check step comprising capturing a second fresh user biometric for verification and generation of a time limited code for completing the check step.

This different technical approach allows border control processes to be automated in such a way as to reduce demand on relevant systems, such as user queueing, while retaining or even enhancing security.

Capturing user information may comprise reading machine readable data from the user travel document. This user travel document may be a biometric passport.

The biometric of the user may be a visual image of the face of the user, in which case capturing a fresh biometric comprises the user capturing a visual image of his or her face with a camera associated with the user computing device.

This is a particularly suitable approach for use with a mobile phone. The user can effectively verify himself or herself by capturing a "selfie".

The border control area may be an airport, or an airport terminal. In this case, suitable check steps may be at bag drop or at the boarding gate. There may also be provision for making a transaction associated with a travel process associated with the border control (for example, buying a seat upgrade), wherein making the transaction comprises verification of the user by obtaining a fresh user biometric. This may be implemented by providing both border control and purchases through a user portal to the airline.

In a second aspect, the disclosure provides a user computing device comprising a processor, a memory, and a biometric capture device, wherein the user computing device is programmed to perform the method as described above.

The biometric capture device may be a camera adapted for capturing a visual image of a user of the user computing device. The user computing device may be a mobile telephone handset.

BRIEF DESCRIPTION OF THE DRAWINGS

Embodiments of the disclosure will now be described, by way of example, with reference to the accompanying Figures, of which.

DETAILED DESCRIPTION

Figure 1:
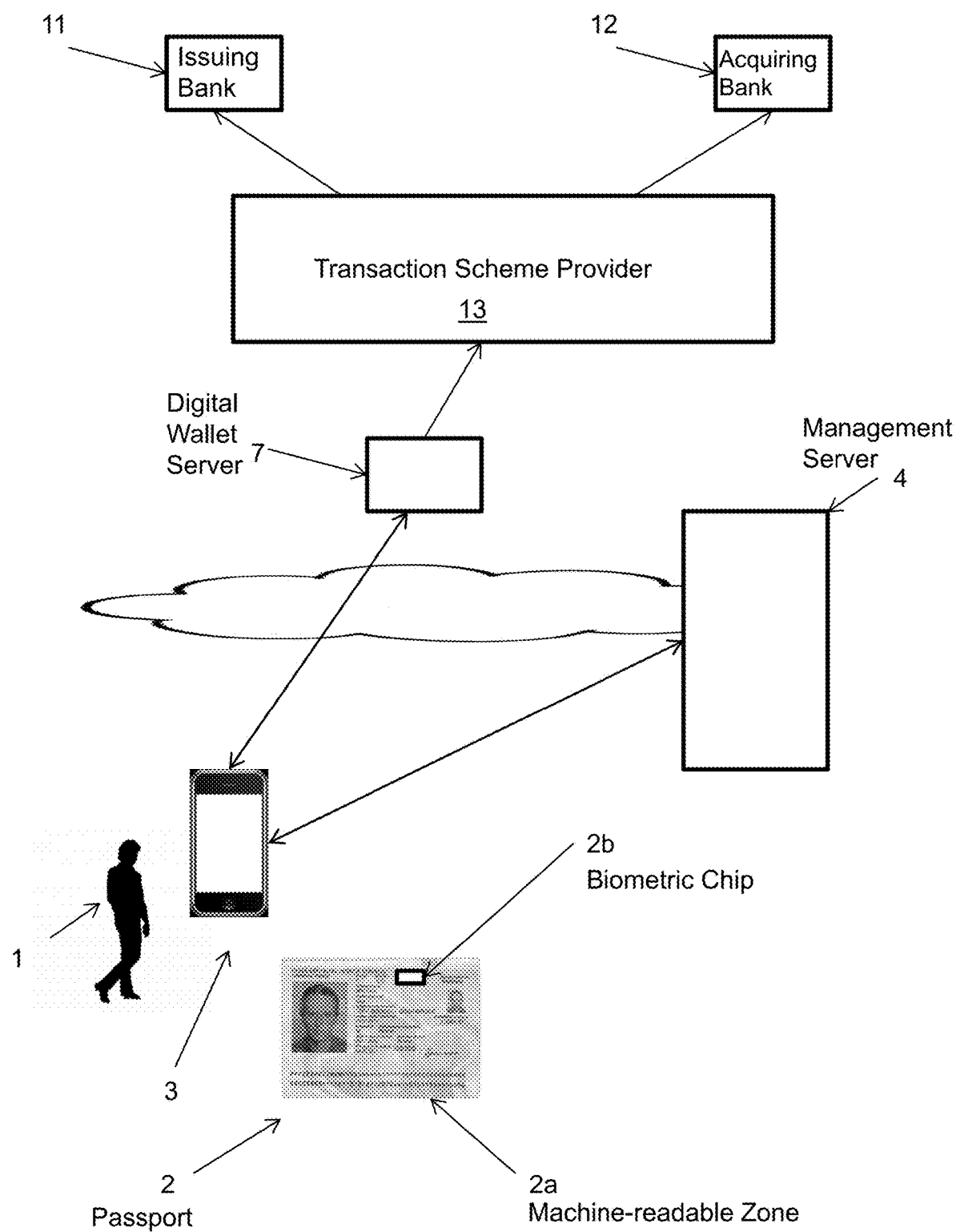
FIG. 1 shows the elements of a system adapted to implement embodiments of the disclosure.

Specific embodiments of the disclosure will be described below with reference to the Figures. FIG. 1 shows elements of a system adapted to implement an embodiment of the disclosure. A traveller 1 has a travel document such as a passport 2 and a mobile telephone 3 (or other appropriate computing device, such as a tablet computer). The passport 2 has a machine-readable zone (MRZ) 2a and a biometric chip 2b. The machine-readable zone 2a will typically conform with the standards set by ICAO Document 9303 and contains characters readily readable by optical character recognition. The biometric chip 2b contains biometric information of the passport owner—most typically a digital image of the passport owner's face—and again will generally conform with standards set by ICAO Document 9303 unless a separate national standard has been defined. The biometric chip 2b can be read by an appropriate contactless reader, similarly to a contactless transaction card, using protocols in accordance with the ISO/IEC 14443 international standard.

The mobile telephone 3 runs a border control application 21, the functionality of which will be described in detail below. The mobile telephone 3 comprises a camera 5—it may also comprise another biometric reader such as a fingerprint sensor 6 (see e.g., FIG. 2A). The mobile telephone 3 may also comprise a digital wallet 22 that allows it to make card payments—in one aspect of the disclosure discussed in more detail below, interaction between the digital wallet and the border control application is shown to allow seat upgrades to be obtained at bag drop.

The mobile telephone 3 is configured to communicate with an airline management server 4, which may itself be connected to a border agency server 28. As discussed, in embodiments of the disclosure, the border control application 24 may interact with a digital wallet server 7—this may serve to initiate a transaction between the mobile telephone 3 and its user, supported by their issuing bank 11, for one part and the airline management server 4 or other airline server supported by their acquiring bank 12 for the other part. This transaction is mediated by a transaction scheme provider 13. While embodiments shown here use the applicant's Masterpass technology (described for example in the applicant's earlier patent publication) EP 3091492, other digital wallet technologies may be used. Conventional digital wallet technologies may be used in connection with embodiments of the disclosure, and so will not be described further here as the skilled person will obtain details as necessary from data sources specific to the digital wallet solution used.

Figure 2A:
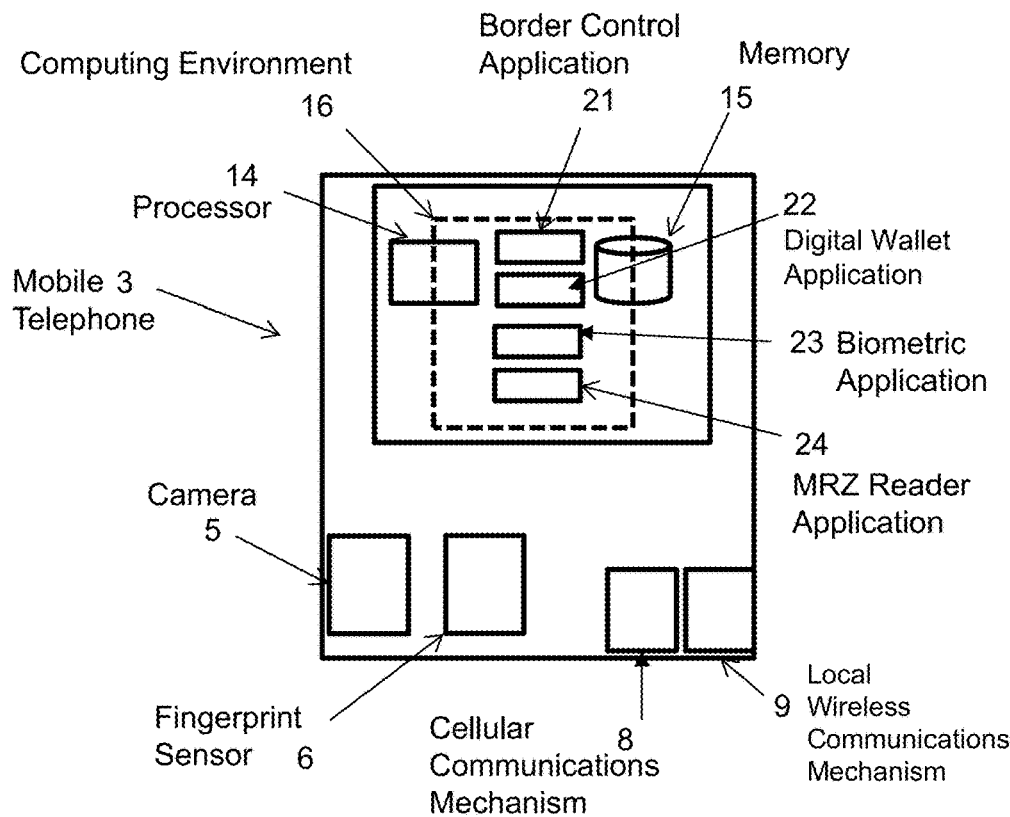
FIGS. 2A and 2B illustrate a computing device and a management server suitable for use in implementing embodiments of the disclosure.

FIG. 2A shows the user mobile telephone 3 with camera 5, fingerprint sensor 6 and cellular telecommunications mechanism 8 and local wireless communications mechanism 9. The telephone 3 has at least one processor 14 and memory 15 defining between them a computing environment 16. The computing environment 16 runs the border control application 21 and a digital wallet application 22. These connect as necessary with the camera 5 and the fingerprint sensor 6, mediated as appropriate by a biometric application 23 to determine biometric authentication. The biometric application 23 may be from an existing off-the-shelf system, such as the Daon Personal Identity Verification (PIV) product suite (see for example https://www.daon.com/solutions/employee-credentialing), or from a bespoke solution. An MRZ reader application 24 such as ReadID is used to read machine readable data from the passport.

Figure 2B:
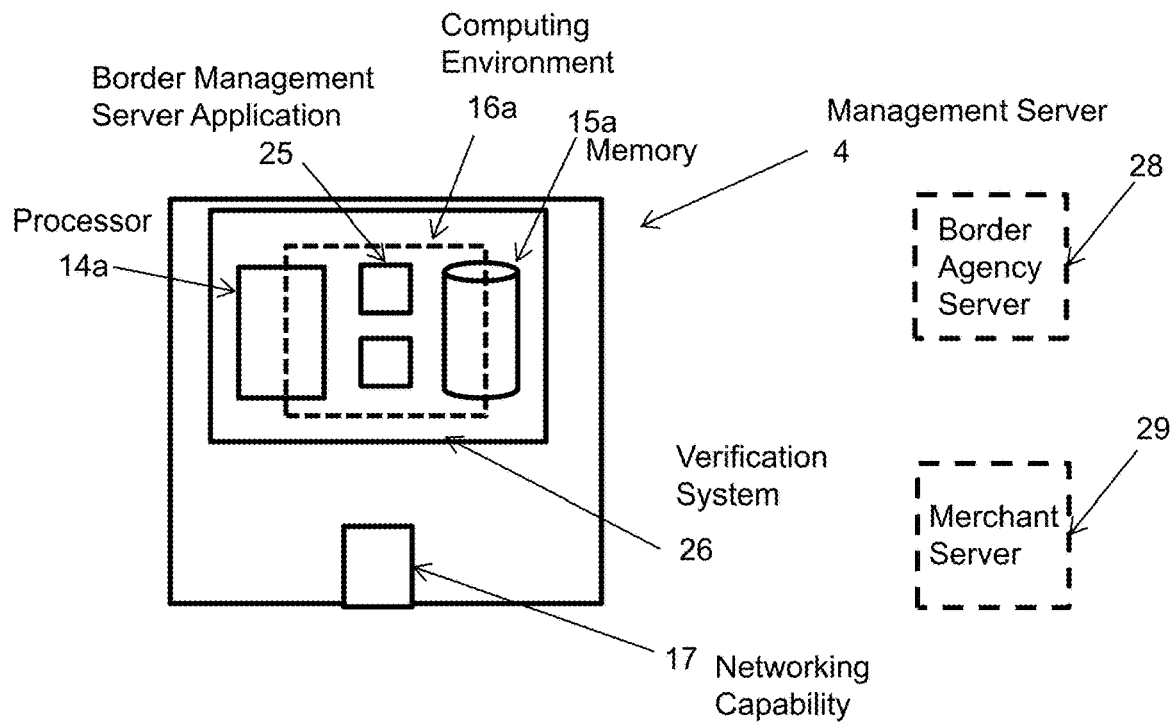

FIG. 2B shows the management server 4, which also has at least one processor 14a and memory 15a defining between them a computing environment 16a. This computing environment 16a runs the border management server application 25 which accesses a verification system 26, for example another part of the Daon Personal Identity Verification (PIV) product suite (alternatively, this may be hosted in another server with a secure connection to the management server 4). The management server 4 includes networking capability 17. The management server 4 may provide information to a border agency server 28. The management server 4 may also interact with a merchant server 29, particularly if other paid services are to be provided (such as a seat upgrade).

Figure 3:
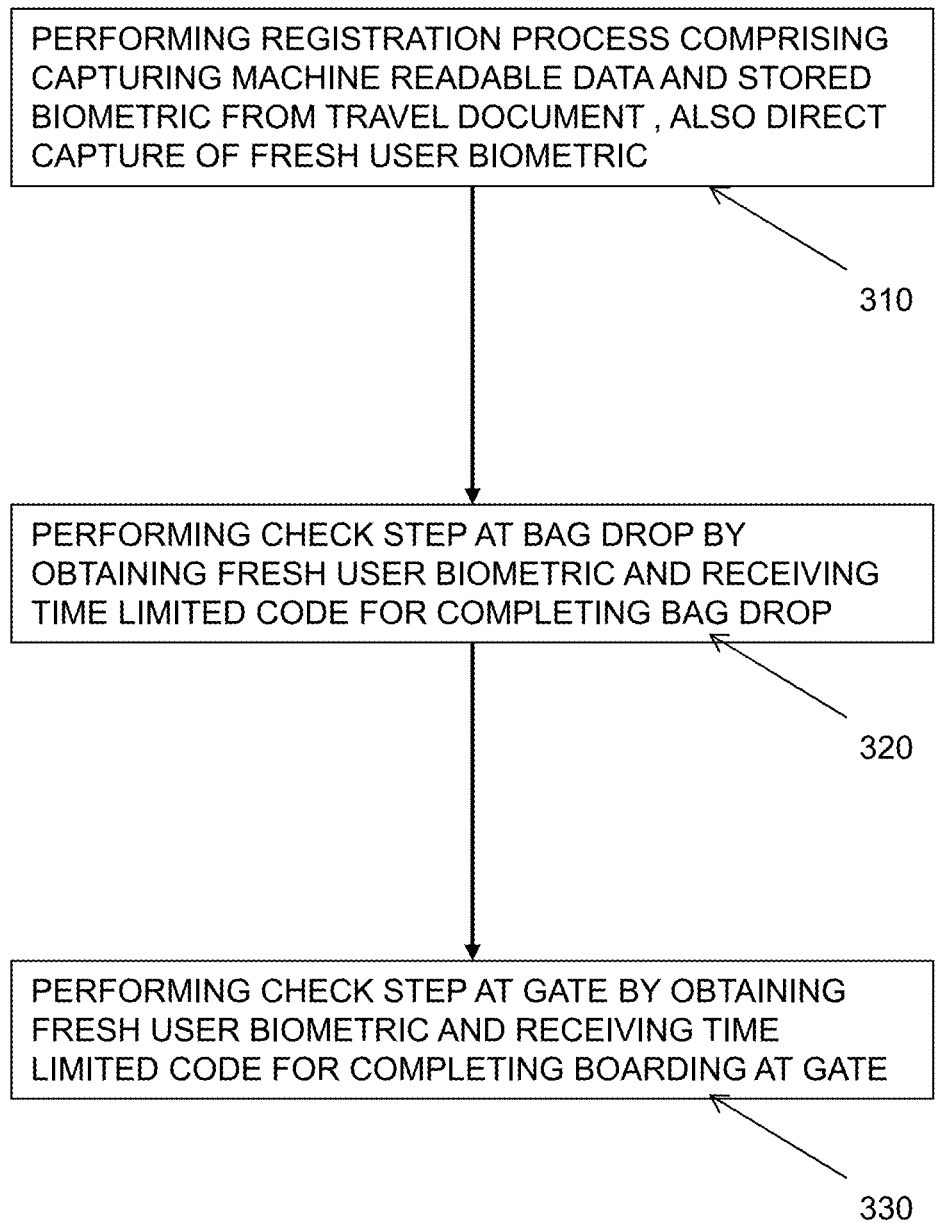
FIG. 3 is a flow diagram indicating a method according to an embodiment of the disclosure.

A process according to a general embodiment of the disclosure is illustrated schematically in FIG. 3. The embodiment provides a computer-implemented process for border control involving interaction between a user computing device such as a mobile phone and a management server. Firstly, the user performs a pre-travel registration process 310 involving capturing a machine-readable part of a travel document and a stored biometric of the user, while also capturing a fresh user biometric at the user computing device. The user then performs one or more check steps 320, 330 before being allowed to complete the border control process. At least one of the check steps 320, 330—in this case both bag drop 320 and boarding gate 330—involve capture of a fresh user biometric and generation of a time limited code for completion of that check step.

Specific embodiments of the disclosure are illustrated in more detail in FIGS. 4 to 13 with reference to screenshots of the mobile telephone user interface taken at different stages of the border control application 21.

Figure 4A:
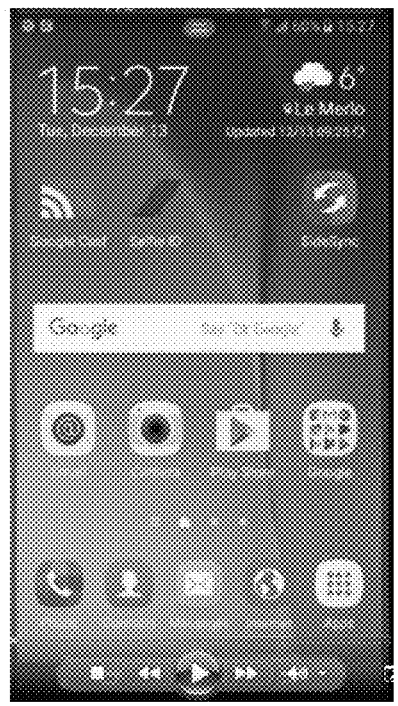
FIGS. 4A to 4C are screenshots illustrating a start up process for an application operating according to an embodiment of the disclosure in a pre-travel registration step.
Figure 4B:
Figure 4C:
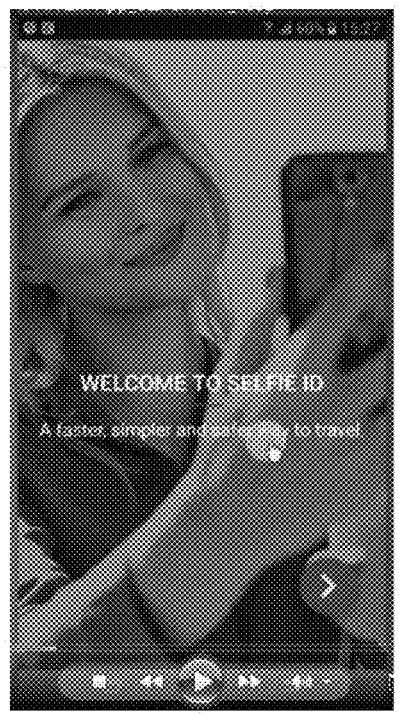

The user begins with a mobile telephone 3 with a built in camera 5 and optionally another biometric sensor such as a fingerprint detector 6, though the embodiment described uses facial image data as the only biometric so other sensors are not required. The border control application 21 is installed on the mobile telephone 3 and made available for selection by the user, as shown in FIG. 4A. As is apparent from FIG. 4A, the embodiment shown uses the Android operating system, but embodiments may equally well be developed for other operating systems. When the application is opened, the border control application 21 is embodied within an airline portal application with additional functionality (see FIG. 4B), from which the border control application 21 may be selected (FIG. 4C).

Figure 5A:
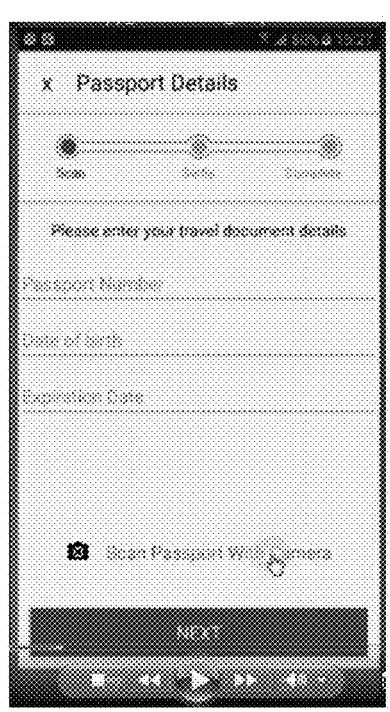
FIGS. 5A to 5G are screenshots illustrating a process of passport scanning for an application operating according to an embodiment of the disclosure in a pre-travel registration step.
Figure 5B:
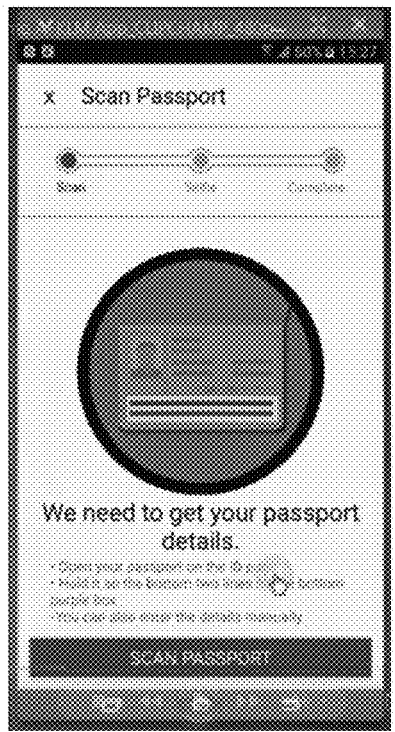
Figure 5C:
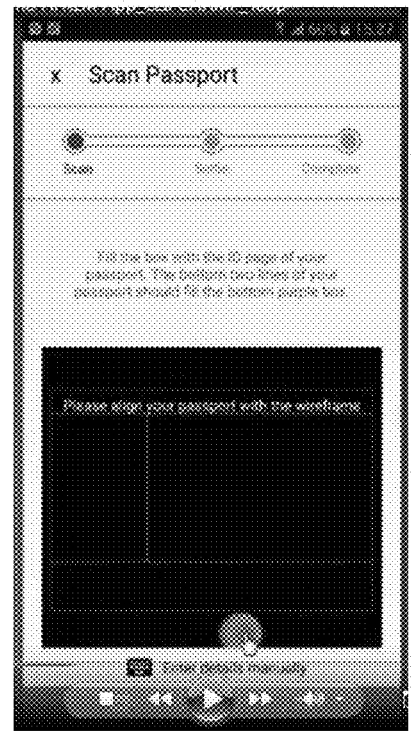
Figure 5D:
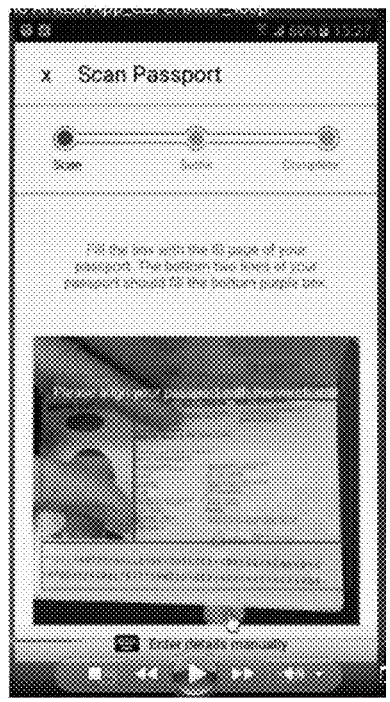
Figure 5E:
Figure 5F:
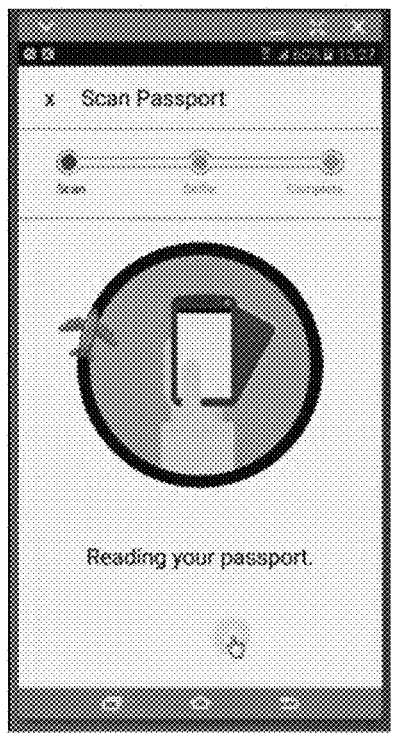
Figure 5G:
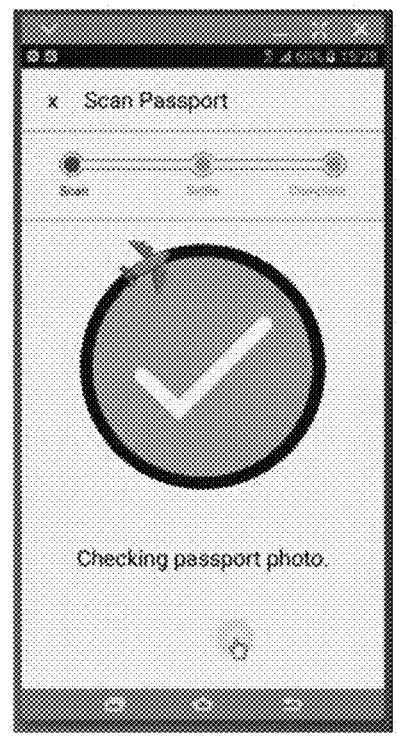

On selection, the border control application requests basic passport details (FIG. 5A)—while this could be achieved by manual entry, a preferred option is direct capture of the information in the MRZ of the passport, as indicated in FIG. 5B. FIG. 5C informs the user of how to capture this information, and FIG. 5D shows successful capture. The passport holder's biometric information is held in the passport chip. FIG. 5E shows the user how to hold the passport and phone together so that the chip information can be read over a short range wireless connection, with FIG. 5F shown during the reading process and FIG. 5G showing that the information has been checked. When this information has been captured and checked, a live image also needs to be taken.

Figure 6A:
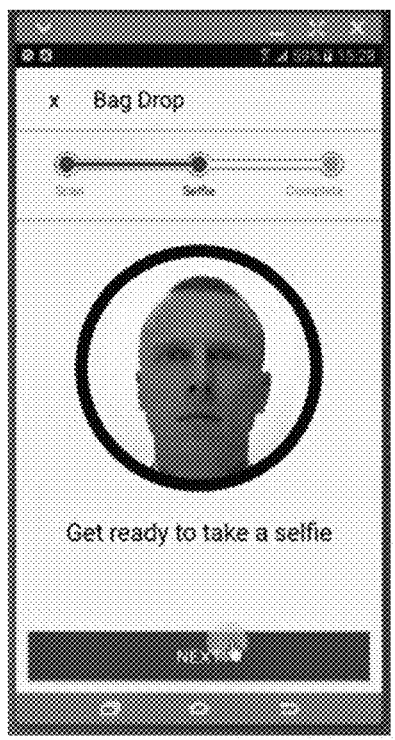
FIGS. 6A to 6I are screenshots illustrating a process of (selfie) image capture for verification for an application operating according to an embodiment of the disclosure in a pre-travel registration step.
Figure 6B:
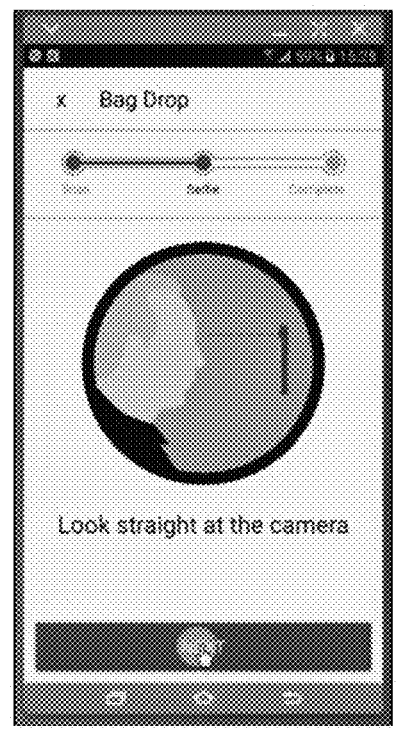
Figure 6C:
Figure 6D:
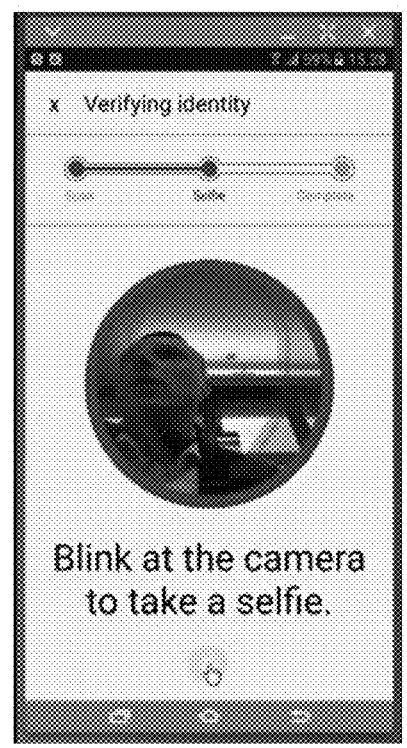
Figure 6E:
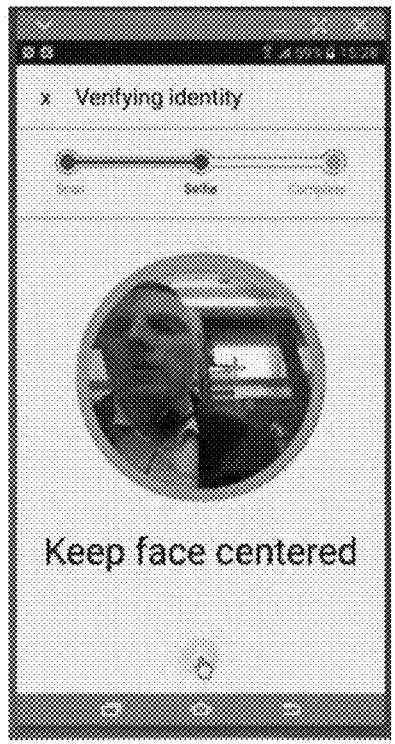
Figure 6F:
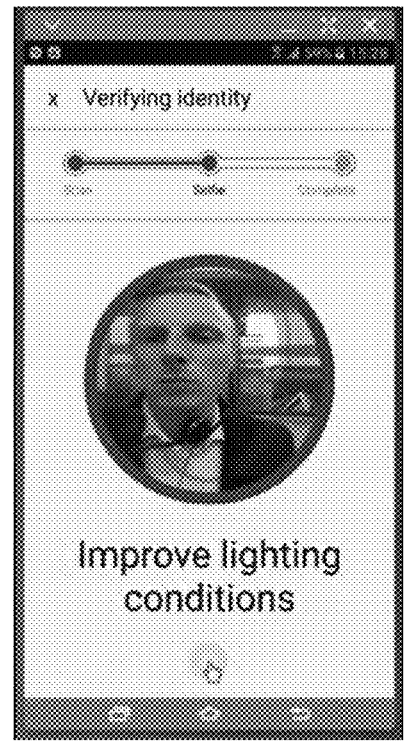
Figure 6G:
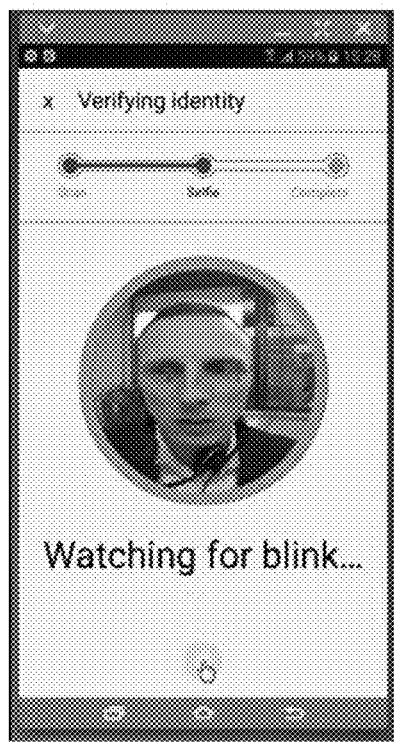
Figure 6H:
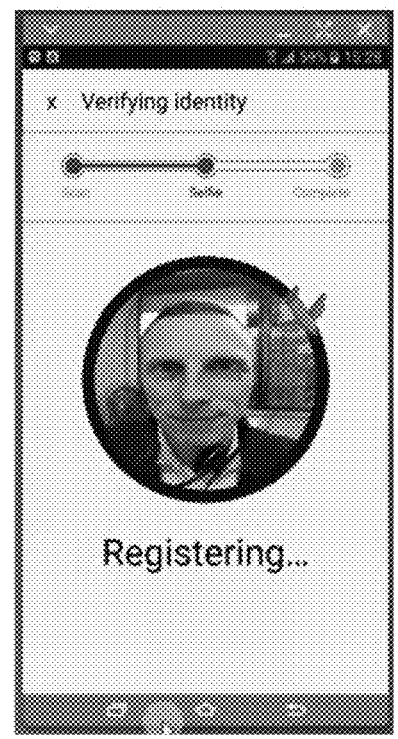
Figure 6I:
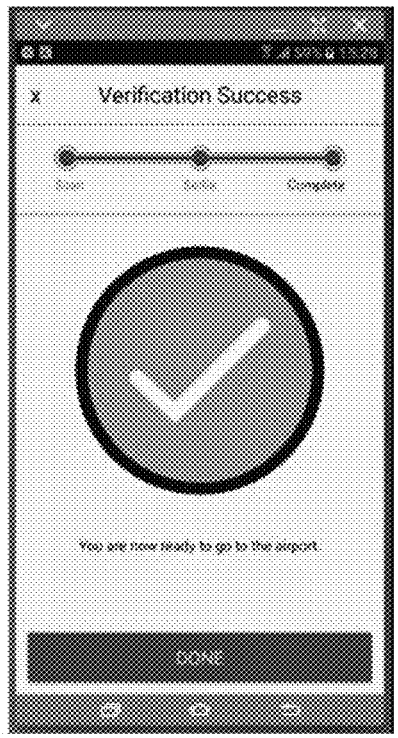

FIG. 6A shows that a passport holder selfie is required, and FIGS. 6B, 6C and 6D provide instructions for taking the picture, with further instructions (FIG. 6E) or warnings (FIG. 6F) provided as necessary, with image capture allowed (FIG. 6G) only when it will be acceptable. Registration with the airline management server then takes place (FIG. 6H) using the information held on the passport and the "fresh" user image used for verification (FIG. 6I).

At this point the user is registered, typically for a specific flight (to ensure freshness, registration may for example be limited to a specified period before the flight takes place). The user may obtain his or her boarding pass at this time.

Figure 7A:
FIGS. 7A to 7C are screenshots illustrating a start-up process for an application operating according to an embodiment of the disclosure in a bag drop step.
Figure 7B:
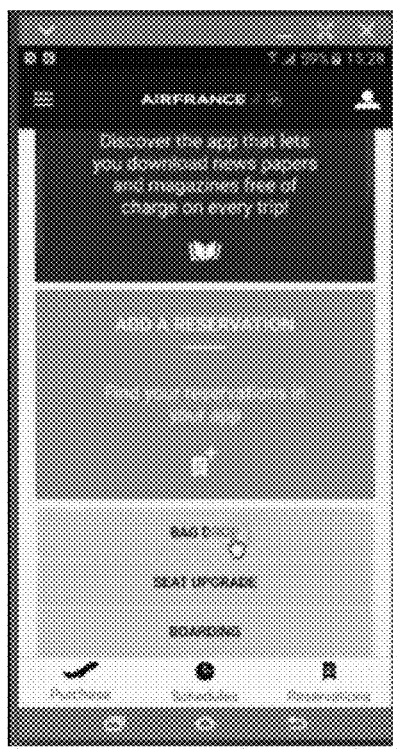
Figure 7C:
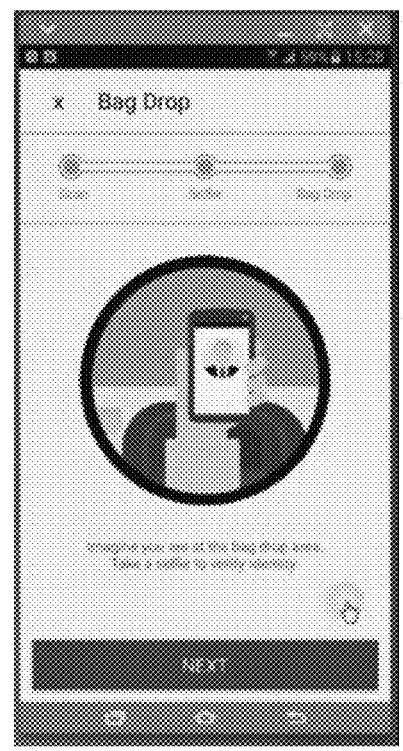
Figure 8A:
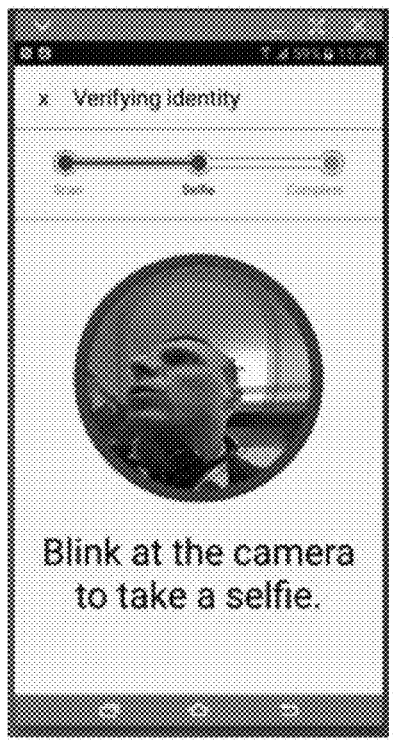
FIGS. 8A to 8G are screenshots illustrating a process of (selfie) image capture for verification for an application operating according to an embodiment of the disclosure in a bag drop step.
Figure 8B:
Figure 8C:
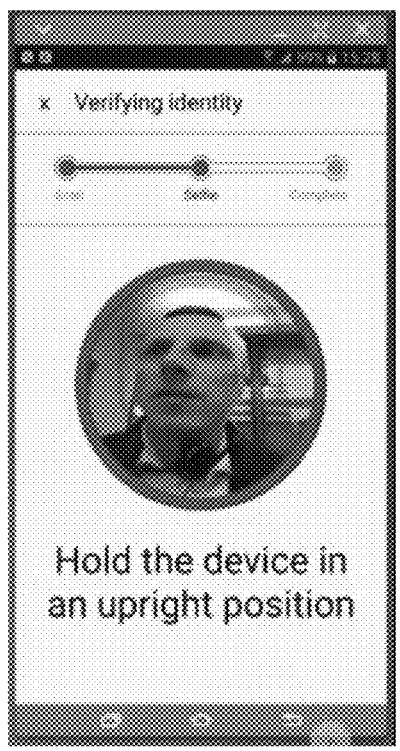
Figure 8D:
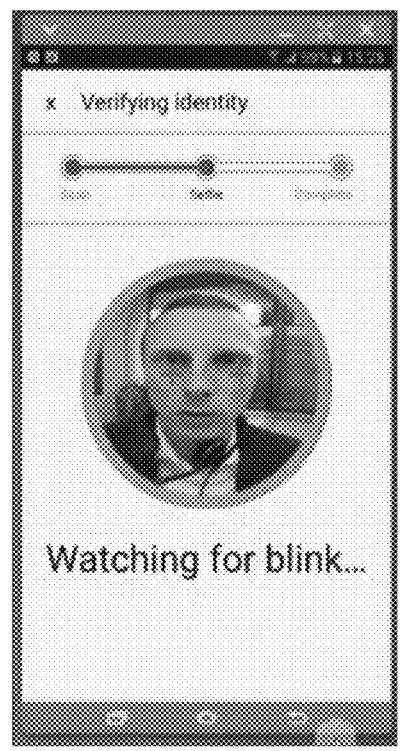
Figure 8E:
Figure 8F:
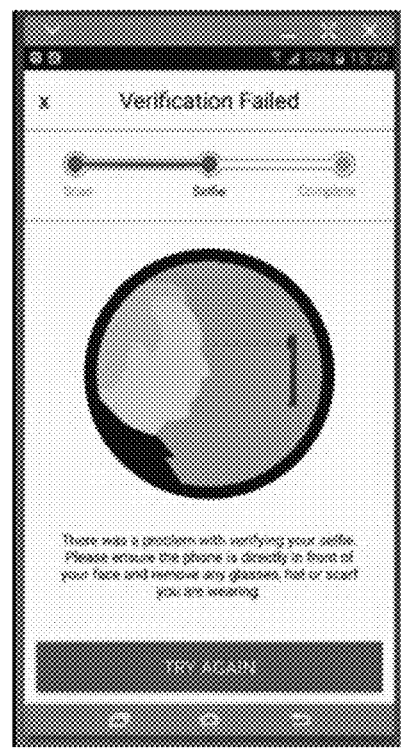
Figure 8G:

The user proceeds to the airport, and at this point, the border control application may be activated again for bag drop (FIGS. 7A and 7B). The user is now interacting with the airline management server to enable access to an airline system—the bag drop apparatus. The user is again requested to take a "live" picture (FIG. 7A). The process of user verification is essentially the same as before (FIGS. 8A to 8E) except that in the case shown the verification fails (FIG. 8F), possibly in this case for poor facial orientation leading to a recognition fault (considering the image of FIG. 8E). The user is invited to verify again (FIG. 8G), which in this case is successful.

Figure 9A:
FIGS. 9A to 9C are screenshots illustrating a process of timed bag drop for an application operating according to an embodiment of the disclosure.
Figure 9B:
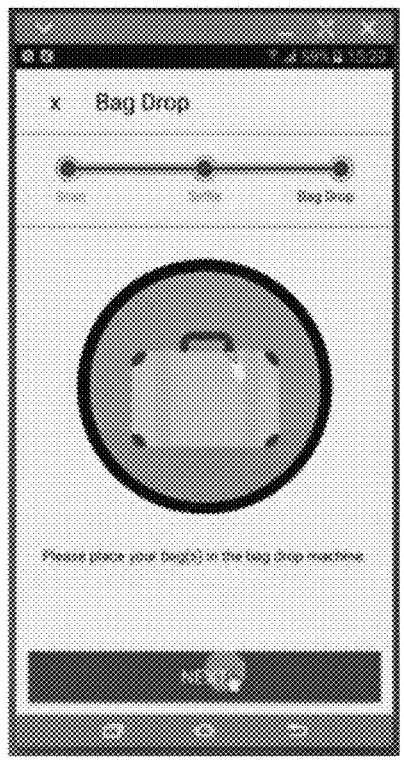
Figure 9C:
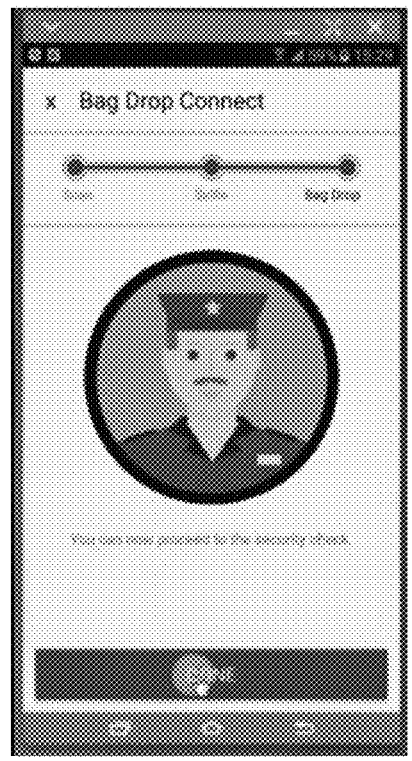

The result of success at the bag drop verification is the generation of a 2D barcode (FIG. 9A) that will allow the user to complete the bag drop process. The barcode is time limited to ensure that the system is not abused, and that the bearer of the passport is also the bearer of the bag—the user is here required to complete the remaining part of the bag drop process (FIG. 9B) within five minutes in order to achieve success (FIG. 9C).

Figure 10A:
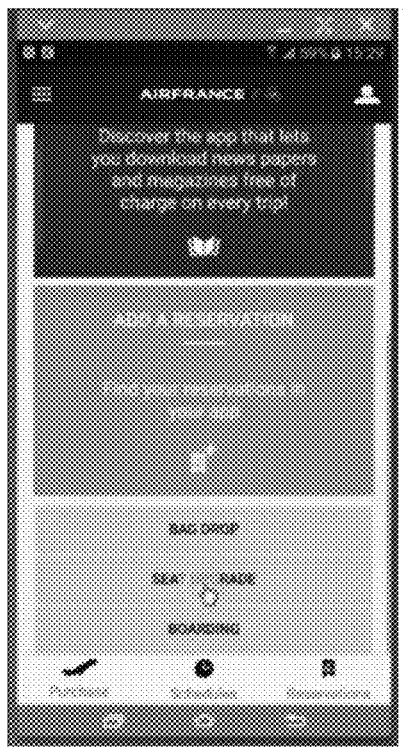
FIGS. 10A to 10H are screenshots illustrating a process of seat upgrade purchase for an application operating according to an embodiment of the disclosure.
Figure 10B:
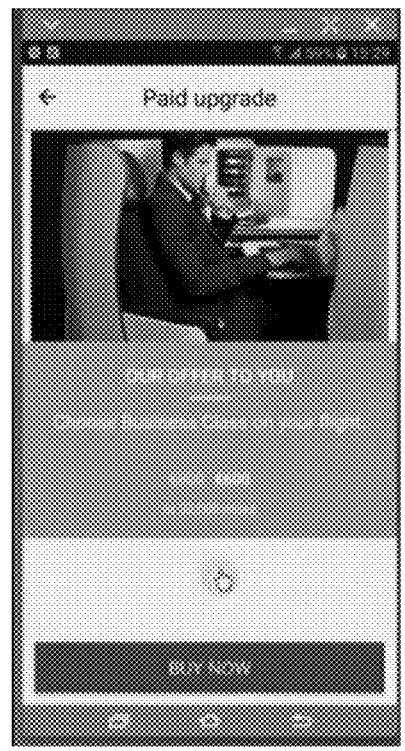
Figure 10C:
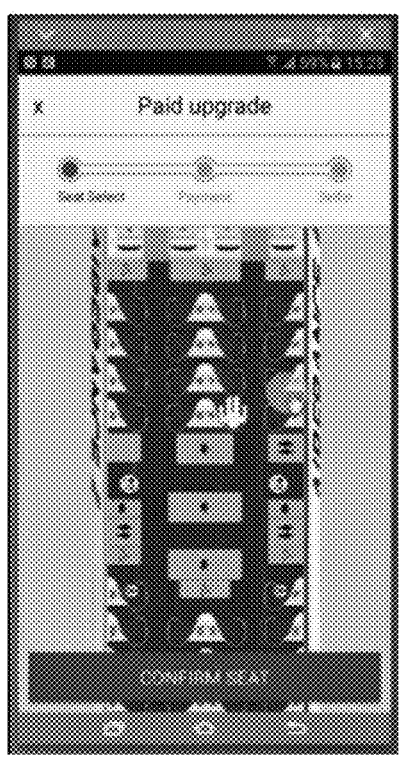
Figure 10D:
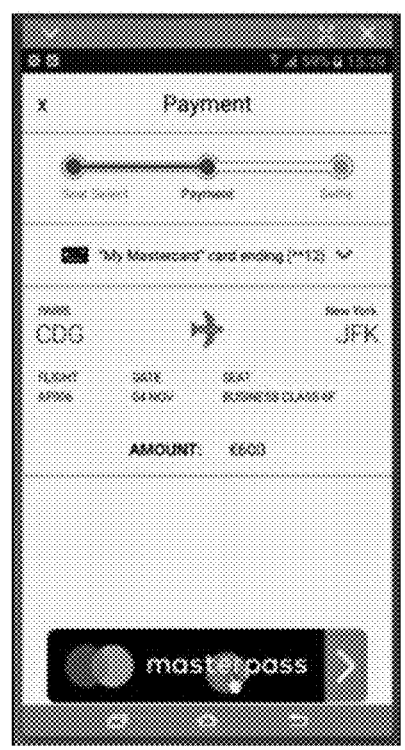
Figure 10E:
Figure 10F:
Figure 10G:
Figure 10H:
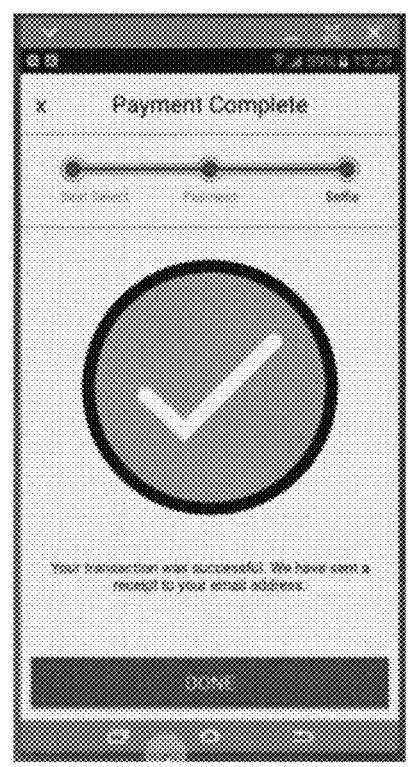

There may be an intervening check by the official border agency (unless it is agreed that this should be replaced by this process), but the application is enabled for further use at the boarding gate. However, as indicated above, the border control application 21 may be combined into a portal application, and similar methodology can be used to make relevant purchases, such as a seat upgrade. FIG. 10A shows selection of a seat upgrade application, with FIG. 10B showing an offer for the customer (which may be personalised to that customer). The customer in this case accepts, makes a seat selection (FIG. 10C) and is invited to pay using their digital wallet (in this case, Masterpass) as shown in FIG. 10D. On selection of Masterpass for payment, selfie capture may also be used as a user verification technology, so in this case the same image capture steps take place as before (FIG. 10E to FIG. 10G), with a payment verification screen (FIG. 10H) indicating that the upgrade has been successful.

Figure 11A:
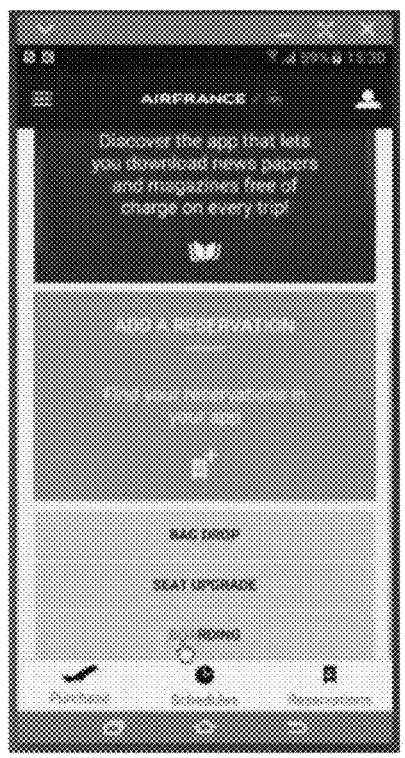
FIGS. 11A to 11E are screenshots illustrating an initial boarding gate process for an application operating according to an embodiment of the disclosure.
Figure 11B:
Figure 11C:
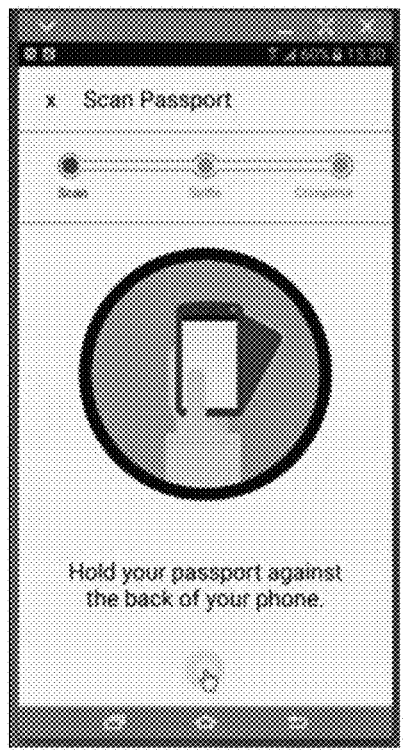
Figure 11D:
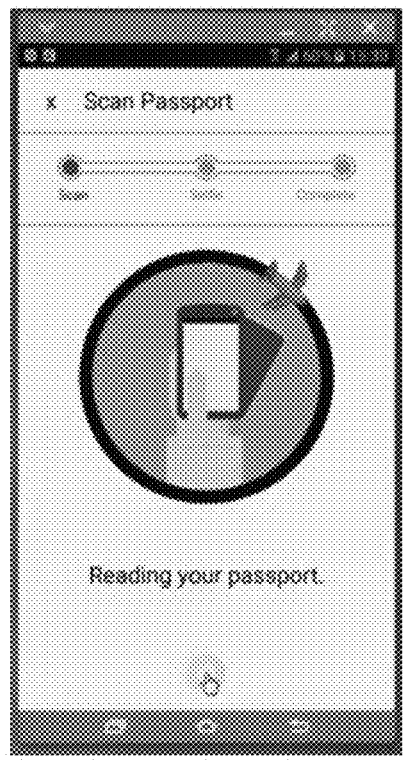
Figure 11E:
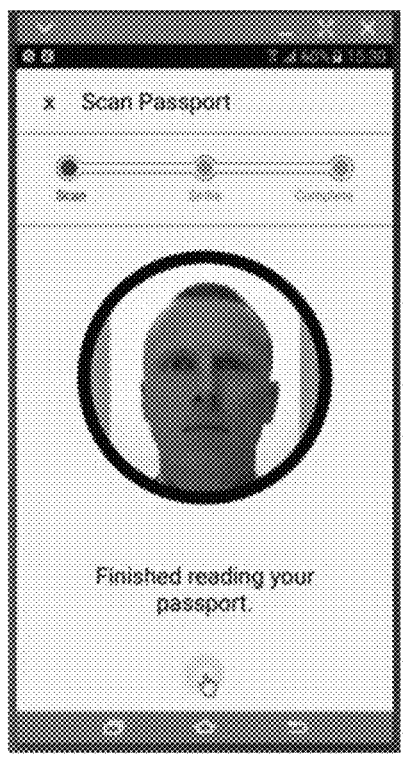
Figure 12A:
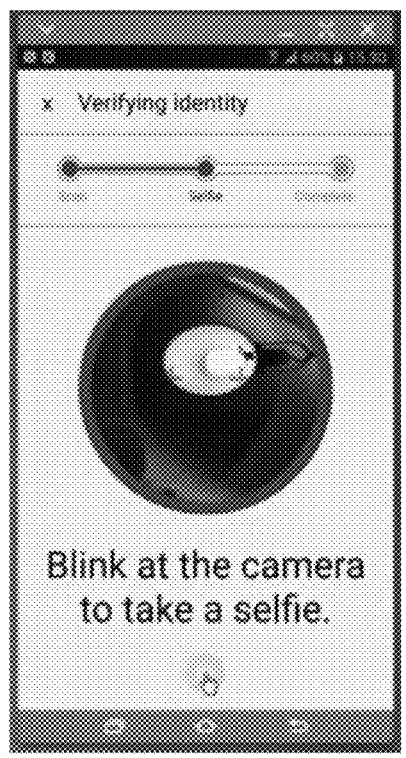
FIGS. 12A to 12C are screenshots illustrating a process of (selfie) image capture for verification for an application operating according to an embodiment of the disclosure in a boarding gate step.
Figure 12B:
Figure 12C:
Figure 13A:
FIGS. 13A and 13B are screenshots illustrating a final boarding gate process for an application operating according to an embodiment of the disclosure.
Figure 13B:
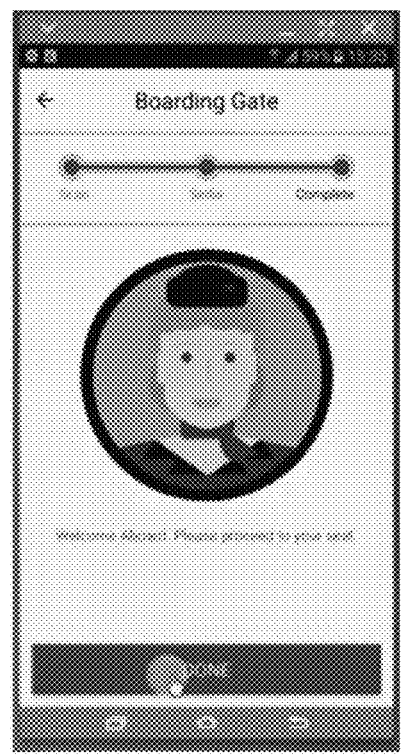

FIG. 11A shows the activation of the border control application at the boarding gate (FIG. 11B)—the user is now interacting with the airline management system to obtain permission to pass through the boarding gate. The stored biometric data is collected as at registration (FIGS. 11C to 11E), and the user takes a verification selfie as before (FIG. 12B) for user verification (FIG. 12C). There is again a time limited code generated (FIG. 13A) for the user to scan at the gate. The combination of data available from user registration, presence of the passport and presence of the legitimate bearer together provide a sufficient guarantee that the correct customer is on the plane.

While this specific approach may be used to provide border control in a secure and reliable way, the skilled person will appreciate that the embodiments described here are exemplary, and that modifications may be made and alternative embodiments provided that fall within the scope of the disclosure. For example, this approach is not necessarily limited to airline transit but could be modified for other transport types, such as trains and sea crossings. This approach can be used for other types of interaction between a user and a government agency (or other authority)—examples may include identification of citizens for online tax filings, or remote enrolment of new banking customers to meet KYC requirements. Aspects of the described process are not limited to the embodiment specifically described. Other proprietary or bespoke solutions may be used for verification using biometric information, or for reading machine readable data from a passport or other travel or identification document. Other biometrics could be used, such as a fingerprint. Additional checks may be made, including checks of other types. Freshness criteria could be modified or determined according to the perceived risk involved with individual steps of the process.

What is claimed is:

1. A computer-implemented method for border control involving interaction between a mobile computing device of a user and a management server, the method comprising:
    performing, at the mobile computing device of the user, a registration process involving capturing user information and a stored biometric of the user from a user travel document, while also capturing a first fresh user biometric at the user computing device for verification to register the user at the management server; and
    after the registration process and as part of a check step for travel related to passage across a national border, performing, at the same mobile computing device of the user, a check step process comprising:
        capturing a second fresh user biometric for verification; and
        generating a time limited code for completing the check step, the time limited code having a time limit for being scanned starting from generation of the time limited code at the check step process.

2. The method of claim 1, wherein capturing the user information comprises reading machine readable data from the user travel document.

3. The method of claim 2, wherein the user travel document is a biometric passport.

4. The method of claim 1, wherein the user travel document is a biometric passport.

5. The method of claim 1, wherein the biometric of the user is a visual image of the face of the user, and wherein capturing a fresh biometric comprises the user capturing a visual image of his or her face with a camera associated with the mobile computing device of the user.

6. The method of claim 1, wherein the check step takes place at an airport.

7. The method of claim 6, wherein the check step takes place at bag drop.

8. The method of claim 6, wherein the check step takes place at a boarding gate.

9. The method of claim 1, further comprising making, at the mobile computing device of the user, a transaction associated with a travel process, wherein making the transaction comprises verification of the user by obtaining a fresh user biometric.

10. A mobile computing device of a user comprising a processor, a memory, and a biometric capture device, wherein the mobile computing device of the user is programmed to interact with a management server to perform a computer-implemented method for border control by:
    performing a registration process involving capturing user information and a stored biometric of the user from a user travel document, while also capturing a first fresh user biometric via the biometric capture device at the user computing device for verification to register the user at the management server; and after the registration process and as part of a check step for travel related to passage across a national border, performing a check step process comprising:
capturing, via the biometric capture device, a second fresh user biometric for verification; and
generating a time limited code for completing the check step, the time limited code having a time limit for being scanned starting from generation of the time limited code at the check step process.

11. The mobile computing device of claim 10, wherein the biometric capture device is a camera adapted for capturing a visual image of the user of the mobile computing device.

12. The mobile computing device of claim 11, wherein the mobile computing device is a mobile telephone handset.

13. The mobile computing device of claim 10, wherein the mobile computing device is a mobile telephone handset.

14. The mobile computing device of claim 10, wherein capturing user information comprises reading machine readable data from the user travel document.

15. The mobile computing device of claim 10, wherein the user travel document is a biometric passport.

16. The mobile computing device of claim 10, wherein the mobile computing device is programmed to interact with the management server to further perform a computer-implemented method comprising making a transaction associated with a travel process, wherein making the transaction comprises verification of the user by obtaining a fresh user biometric.

17. Memory with instructions for a border control application stored thereon, that when executed by a mobile computing device, directs the mobile computing device to:
capture user information and a stored biometric of a user from a travel document;
capture a first fresh user biometric;
perform a registration process by communicating with a management server and using the user information and the stored biometric from the travel document and the first fresh user biometric;
after completing the registration process, capture a second fresh user biometric;
communicate with the management server obtain a verification of the user using the second fresh user biometric;
in response to receiving the verification, generate a time limited code for use to complete a check step for travel related to passage across a national border, the time limited code having a time limit for being scanned starting from generation of the time limited code at the check step.

18. The memory of claim 17, further comprising instructions stored thereon, that when executed by the mobile computing device, direct the mobile computing device to:
provide a user portal for purchases related to the travel related to passage across the national border; and
perform a transaction verification for a transaction carried out via the user portal by capturing a third fresh user biometric and communicating with the management server obtain the transaction verification of the user using the third fresh user biometric.

19. The memory of claim 17, wherein the time limited code for use to complete the check step is a time limited code for a bag drop.

20. The memory of claim 17, wherein the time limited code for use to complete the check step is a time limited code for a boarding gate.

* * * * *